May 12, 1970 V. K. ELORANTA 3,511,157

CAMERA SHUTTER AND DIAPHRAGM APPARATUS

Filed Aug. 30, 1967

INVENTOR.
*Vaito K. Eloranta*

BY

*Brown and Mikulka*
ATTORNEYS

United States Patent Office 3,511,157
Patented May 12, 1970

3,511,157
CAMERA SHUTTER AND DIAPHRAGM APPARATUS

Vaito K. Eloranta, Needham, Mass., assignor to Polaroid Corporation, Cambridge, Mass., a corporation of Delaware Filed Aug. 30, 1967, Ser. No. 664,498
Int. Cl. G03b 9/00
U.S. Cl. 95—53 7 Claims

ABSTRACT OF THE DISCLOSURE

Exposure control apparatus for a photographic camera includes a pair of shutter blades mounted adjacent an exposure aperture for opening and closing movement relative thereto. An electromagnetic device is energized by a controlled electrical pulse produced by discharge of a capacitance for driving the shutter blades to an open position, in a positive manner, against the bias of a spring. De-energization of the electromagnetic device permits the spring to effect closure of the shutter blades. The amount of blade movement may be controlled to vary the effective size of the exposure aperture.

Objects of the invention are to provide a shutter adapted to incorporation with a compact camera which is electrically driven in a positive and efficient manner by a solenoid which receives a controlled energy pulse from a charged capacitor; to provide shutter apparatus, of the character described, which is of simple and relatively inexpensive construction and powered by a small battery; to provide shutter apparatus, as stated, which is either of a fixed- or variable-speed type; to provide shutter apparatus, of the category described, which is electrically actuated by a shutter-release element in the form of a manually operable switch; to provide apparatus of the nature set forth as a combined shutter-diaphragm; to provide apparatus, as characterized, which is particularly adapted to photography under low-level lighting conditions; and to provide shutter-diaphragm apparatus which incorporates means for modifying aperture and time control characteristics thereof.

Other objects of the invention will in part be obvious and will in part appear hereinafter.

The invention accordingly comprises the apparatus possessing the construction, combination of elements and arrangement of parts which is exemplified in the following detailed disclosure and the scope of the application of which will be indicated in the claims.

For a fuller understanding of the nature and objects of the invention, reference should be had to the following detailed description taken in connection with the accompanying drawing wherein.

Figure 1:
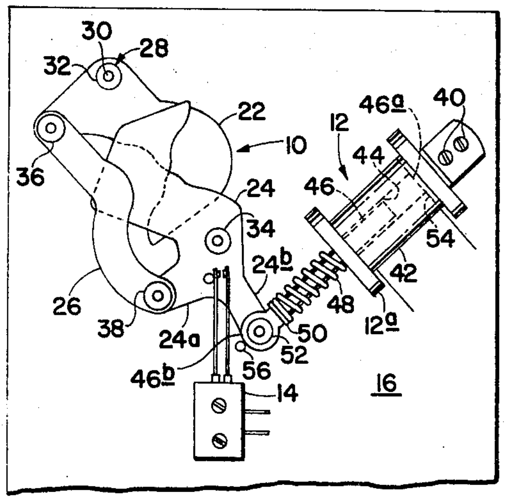
FIG. 1 is a diagrammatic rear view of the shutter and diaphragm apparatus at closed position.

Referring now to the drawing, a shutter-diaphragm element 10, a solenoid 12, and flash-contact means 14 are mounted on a plate or web 16 adjacent to an exposure aperture 18 identified with a frontal housing portion 20 of a camera. The shutter-diaphragm element 10 includes a pair of blades 22 and 24 and interconnecting linkage 26. Blade 22 is pivotally mounted on the plate 16 at 28, as for example, by a suitable grooved stud 30 and a slotted retaining washer 32. Similar pivotal mounting means or means of any other suitable type, may be utilized wherever a pivotal mounting of elements is described, the exact structure thereof being considered as unnecessary of repetition in each instance.

The blade 24, in the form of a modified bell-crank, overlies blade 22 and is pivotally mounted on the plate 16 at 34. The curved or angled link 26 overlies both blades 22 and 24. It is pivotally connected at 36 to blade 22 and to an extremity of a first arm **24*a* of blade element 24 at 38. The lens aperture 18, normally covered by the closed shutter-diaphragm blades 22 and 24**, as in FIG. 1, is shown in a substantially uncovered condition by the open blades of FIG. 2.

The solenoid 12 is fixedly attached at 40 to the mounting-plate 16. It includes a conventional cylindrical coil component 42 having a central longitudinal bore or aperture 44, a movable core or plunger 46, and an extension-type return-spring 48 bearing, respectively, against the end-piece **12*a* and the flange 50 of core 46. The outer end of core component 46 is pivotally attached at 52 to an extremity of the second arm 24*b* of blade element 24. When the coil 42 is electromagnetically energized, the movable core 46 is drawn inwardly of the bore to the limit provided by contact of its extremity 46*a* with a limit-stop element such as a small plate 54**. The latter may be composed of a metal, a plastic or a more pronouncedly shock-absorbing resilient material such as a synthetic rubber, a felt, etc.

Figure 2:
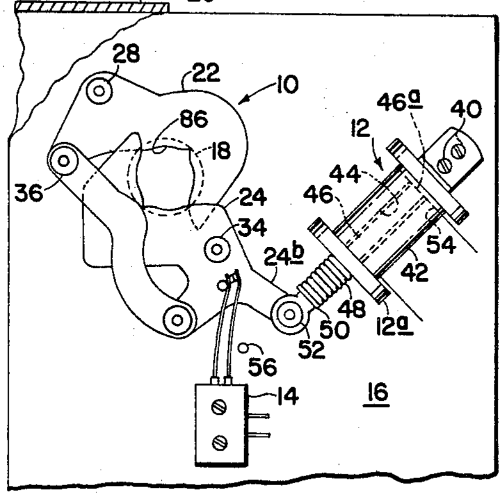
FIG. 2 is a diagrammatic rear view of the shutter and diaphragm apparatus at open position.
Figure 3:
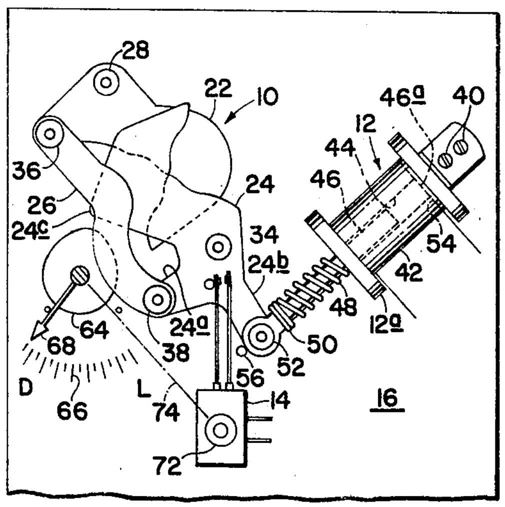
FIG. 3 is a diagrammatic rear view of the shutter and diaphragm apparatus including means for varying aperture, time and flash contacts associated therewith.

Upon movement of the core component 46 to its innermost position within the bore 44, under the electromagnetic action of coil 42 and as determined by contact of the extremity **46*a* with the limit-stop 54, the shutter is brought to a fully open position, as shown in FIG. 2. The spring 48 is thus compressed by a given amount. Upon termination of the electromagnetic force, the core 46 is biased to its maximum outward position in a reciprocative movement by the force applied by the extending spring 48 and the shutter is brought to a completely closed condition, as shown in FIGS. 1 and 3. The limit of outward travel of the core 46 is preferably determined by contact of a moving part with a fixed element, e.g., through contact of its outer extremity 46*b* with a limit-stop pin 56, the latter, optionally, being faced with a resilient material for shock-absorbing purposes. The flash contact element 14** is so constructed and arranged as to provide a desired synchronization of a flash unit, not shown, as, for example, to produce a flash at an approximate half-opening of the shutter blades.

Figure 4:
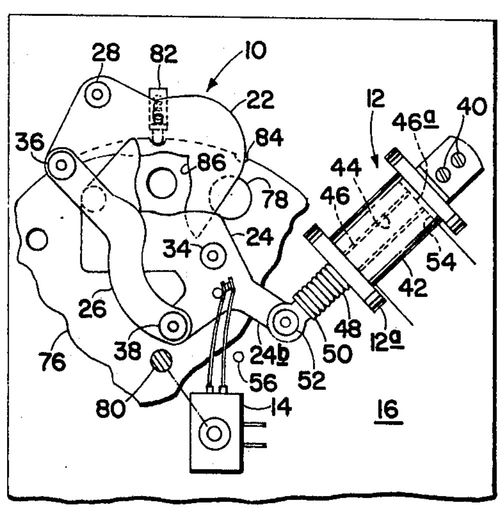
FIG. 4 is a diagrammatic rear view of the shutter and diaphragm apparatus including modified means for varying the aperture and flash contacts.
Figure 5:
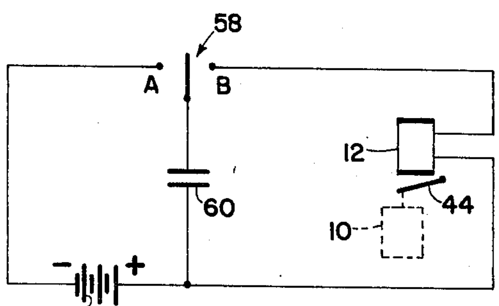
FIG. 5 is a wiring diagram of the solenoid-driven shutter circuit.

An electrical circuit for energizing the solenoid 12 is shown in FIG. 5. A single-pole-double-throw switch 58 when closed with contact "A" charges a capacitor 60, voltage for the purpose being provided by a small battery 62. Upon closing the movable switch element with contact "B," the capacitor is caused to discharge across the solenoid 12, providing a pulse which electromagnetically moves the core 46 of the latter and opens the shutter, as above described, with special reference to FIGS. 2 and 4. Upon opening of the switch 58, the shutter closes, under the bias of the spring 48, as previously described and shown in FIGS. 1 and 3. It will be understood that switch 58 is preferably of a type providing a predetermined contact of points "A" and "B" adapted to charge and discharge the capacitor 60 through a single continuous movement of the movable switch component.

For purposes of illustration, let it be assumed, for example, that a solenoid of a type having a nominal power rating of 2 watts and a maximum travel of the core of ¼ inch is employed. A solenoid suitable for the purpose is the "Model SP 25" sold by Electromechanisms, Inc., 407 Chestnut Ave., Monrovia, Calif., U.S.A. A battery of 22.5 volts and a capacitor of 1000 microfarads may be utilized therewith, as in the circuit of FIG. 5. Assuming a given appropriate tensioning capability or elasticity of the return-spring 48, there is provided an open-closed cycle of shutter operation of between ¹⁄₃₀ to ¹⁄₆₀ second. Within this range of shutter speeds, an appropriate closing of the flash contacts occurs approximately 5 milliseconds prior to a complete opening of the shutter blades. It will be recognized that the shutter speed is subject to variation through modification of one or more of the above-enumerated components. The basic structure is particularly adapted to photography under prevailing low-level light conditions, employing flash illumination therewith.

As thus far described, it will be apparent that the apparatus constitutes a unitary diaphragm and shutter which determines both the size of the exposure aperture and the period of light transmission therethrough. In FIG. 3 there is included coacting means for varying the exposure aperture in the form of a rotatable cam 64 which is subject to rotation either by manual or associated semiautomatic photometric means not shown. The cam lobe is adapted to bear against the edge-surface 24*c* of blade component 24 thereby to vary the degree of counterclockwise rotation of the latter and, through the medium of link 26, counterclockwise movement of blade 22 to modify the size of the aperture. In so doing, it will be apparent that the length of travel of the solenoid core 46 is also modified to provide an alteration of the time required to achieve a complete cycle of shutter operation, that is, a modification of shutter speed. As illustrated, a scale 66 and pointer 68 are included, the scale having "D" (darken) and "L" (lighten) designations in terms of the photographic print. The pointer is adapted to rotate to stop means 70 which control the maximum rotation of the cam 64. The flash contact means 14 is shown as rotatably mounted at 72, an interconnection thereof with the shaft mounting cam 64 being indicated to provide a modified closing of the contacts in accordance with an altered exposure aperture. Through the use of the cam 64 and reduction of aperture and time factors, the apparatus is rendered adapted to use throughout a wider range of environmental brightness, e.g., without flash illumination.

In FIG. 4 a supplemental diaphragm plate 76 comprising a plurality of apertures 78 of relatively different size formed therein is illustrated. The plate is rotatably mounted at 80 and detent means 82 is provided for engaging the recesses 84 formed in the plate periphery to position the apertures of the plate in exact optical alignment with the aperture 86 provided by the completely opened shutter blades. The plate 76 may be operated either manually or by associated photometric means, not shown, an interconnection with the flash contact means 14 for compensating adjustment of the points of the latter being indicated by the broken line 88. The smaller apertures of the plate 76 may be suitable for daylight photography, without the flash accessory.

While the shutter-diaphragm shown is of a two-bladed construction and constitutes a preferred example, it will be understood that a different number of blades could be employed for the purpose in conjunction with a solenoid driving element of chosen electromagnetic and physical characteristics and a circuit of the type shown. While a solenoid is especially suitable as a driving element in the structures shown, it will be apparent that other electromagnetic means, e.g., an electromagnet having a movable magnetic member such as an armature, could be employed for the purpose.

As will be apparent, the shutter apparatus of the invention is adapted to extremely consistent operation. This is because it functions in response to pulses emanating from condenser 60 which are of an identical character.

It will also be noted that the shutter mechanism includes the the self-cocking feature provided by the return-spring 48.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Electromagnetically driven exposure apparatus for incorporation with a camera to perform a photographic exposure, comprising movable shutter-blade means adapted to open and close at first and second positions thereof respectively, said shutter-blade means at said first position defining an exposure aperture to thereby effectively constitute a shutter-diaphragm combination, an electromagnet of given characteristics mounted adjacent to said shutter-blade means, said electromagnet including an electrically energizable coil, an armature and means biasing said armature outwardly of the coil so as to assume a given outward position when said coil is unenergized, means connecting said shutter-blade means to said armature for actuation thereby, and means for energizing said coil to provide a given movement of said armature and connected shutter-blade means, said energizing means comprising an electrical circuit including a source of given potential, a capacitor of given capacitance, and switching means for sequentially charging said capacitor from said source and discharging said capacitor to apply an electrical pluse to the coil of said electromagnet.

2. Electromagnetically driven exposure apparatus for incorporation with a camera to perform a photographic exposure, comprising a plurality of pivotally-mounted blades adapted to open and close at first and second positions thereof respectively, an electromagnet of given characteristics mounted adjacent to said shutter-blade means, said electromagnet including an electrically energizable coil, an armature pivotally connected to an arm portion of one of said blades and means biasing said armature outwardly of the coil so as to assume a given outward position when said coil is unenergized, means connecting said shutter-blade means to said armature for actuation thereby, and means for energizing said coil to provide a given movement of said armature and connected shutter-blade means, said energizing means comprising an electrical circuit including a source of given potential, a capacitor of given capacitance, and switching means for sequentially charging said capacitor from said source and discharging said capacitor to apply an electrical pulse to the coil of said electromagnet.

3. Exposure apparatus, as defined in claim 2, wherein said shutter-blade means is composed of a pair of pivotally-mounted blades interconnected by linkage.

4. Electromagnetically driven exposure apparatus for producing a photographic exposure in a camera having an exposure aperture, said exposure apparatus comprising movable shutter-blade means adapted to open and close at first and second positions thereof respectively, an electromagnet of given characteristics mounted adjacent to said shutter-blade means, said electromagnet including an electrically energizable coil, an armature and spring means biasing said armature outwardly of the coil so as to assume a given outward position when said coil is unenergized, means connecting said shutter-blade means to said armature for actuation thereby, and means for energizing said coil for effecting movement of said armature to a position at which said shutter blade means uncovers said exposure aperture, said spring means being effective to move said armature in a reciprocative movement to a position at which said shutter-blade means covers said exposure aperture, said energizing means and spring cooperating to provide one complete exposure cycle, said energizing means comprising an electrical circuit including a source of given potential, a capacitor of given capacitance, and switching means for sequentially charging said capacitor from said source and discharging said capacitor to apply an electrical pulse to the coil of said electromagnet.

5. Electromagnetically driven exposure apparatus for incorporation with a camera to perform a photographic exposure, comprising movable shutter-blade means adapted to open and close at first and second positions thereof respectively, an electromagnet of given characteristics mounted adjacent to said shutter-blade means, said electromagnet including an electrically energizable coil, an armature and means biasing said armature outwardly of the coil thereof so as to assume a given outward position when said coil is unenergized, means connecting said shutter-blade means to said armature for actuation thereby, means for energizing said coil to provide a given movement of said armature and connected shutter-blade means, and means for varying the extent of said movement of said shutter-blade means, said energizing means comprising an electrical circuit including a source of given potential, a capacitor of given capacitance, and switching means for sequentially charging said capacitor from said source and discharging said capacitor to apply an electrical pulse to the coil of said electromagnet.

6. Exposure apparatus, as defined in claim 5, wherein said means for varying the extent of said movement of said shutter-blade means is in the form of an adjustable cam adapted to bear varyingly against said shutter-blade means.

7. Exposure apparatus, as defined in claim 5, wherein flash contact means is associated with said shutter-blade means and adapted to be varied in position in conjunction with means for varying said movement of said shutter-blade means.

References Cited

UNITED STATES PATENTS

| | | | |
|---|---|---|---|
| 2,856,831 | 10/1958 | Gipe | 95—62 |
| 2,999,445 | 9/1961 | Fahlenberg. | |
| 3,366,024 | 1/1968 | Starp | 95—64 |
| 3,418,904 | 12/1968 | Wick. | |

NORTON ANSHER, Primary Examiner

L. H. McCORMICK, Jr., Assistant Examiner

U.S. Cl. X.R.

95—63, 11.5